United States Patent [19]
Deakin

[11] 4,279,243
[45] Jul. 21, 1981

[54] SOLAR COLLECTOR PANEL

[76] Inventor: David A. Deakin, 3163 Norfolk La., Falls Church, Va. 22042

[21] Appl. No.: 26,184

[22] Filed: Apr. 2, 1979

Related U.S. Application Data

[63] Continuation-in-part of Ser. No. 851,372, Nov. 14, 1977, abandoned.

[51] Int. Cl.$^3$ .................................................. F24J 3/02
[52] U.S. Cl. ..................................... 126/450; 126/417; 126/448; 126/432; 165/135
[58] Field of Search ............... 126/417, 418, 432, 441, 126/446, 442, 450, 448; 165/135

[56] References Cited
U.S. PATENT DOCUMENTS

| | | | |
|---|---|---|---|
| 3,076,450 | 2/1963 | Gough et al. | 126/444 |
| 3,953,110 | 4/1976 | Charoudi | 126/441 X |
| 4,038,967 | 8/1977 | Stout et al. | 126/900 |
| 4,055,163 | 10/1977 | Costello et al. | 126/442 |
| 4,129,177 | 12/1978 | Adcock | 126/435 X |
| 4,143,641 | 3/1979 | Christopher | 126/450 |
| 4,158,355 | 6/1979 | Spitzer | 126/450 X |

*Primary Examiner*—James C. Yeung
*Assistant Examiner*—Larry Jones
*Attorney, Agent, or Firm*—Richard P. Matthews

[57] ABSTRACT

A solar collector panel wherein a dead air space above an absorption plate is provided with a hermetically sealed vapor phase insulating gas within a plastic envelope. The flexible nature of the envelope permits expansion and contraction of the gas therewithin avoiding the necessity for a pressure equalization membrane or valve. A heat transfer fluid is circulated between channels along a sinusoidal path of a plastic member selectively sealed to the underside of the absorption plate.

9 Claims, 7 Drawing Figures

SOLAR COLLECTOR PANEL

This is a continuation-in-part application of Ser. No. 851,372 filed Nov. 14, 1977, now abandoned.

BACKGROUND OF THE INVENTION AND PRIOR ART

This invention relates to improved methods of utilizing solar radiation for heating purposes. Solar radiation is abundantly available on the earth's surface; however, its average intensity during high demand periods is usually minimal. This necessitates the need for very efficient, inexpensive solar energy collectors to make the whole concept economically practical and competitive with conventional fuels. Up until this time one had to compromise efficiency for low cost or vice versa. Maximum efficiency required the use of expensive materials and complicated production methods.

An object of this invention is to provide a method of getting maximum efficiency at a minimum cost in the field of high efficiency solar collectors through a novel means of combining inexpensive construction materials with a new concept in collector plate insulation technique. A further object of the present invention is to provide a solar collector that is basically simple in its design. The present invention eliminates the need for complicated gaskets to form hermetic seals which wear out because of constant thermal expansion and contraction and contact with harsh environmental factors such as high temperature and untraviolet light. Keeping in line with the concept of design simplicity this invention provides a way of eliminating complicated manifold systems which are both expensive and a major course of leaks.

SUMMARY OF THE INVENTION

This invention relates to a novel solar collector panel consisting of a solar radiation absorption plate insulated on the bottom and sides with conventional insulation materials such as styrofoam. In the preferred embodiment, the panel is insulated on the top initially by a dead air space and secondly, by a unique, transparent film envelope hermetically sealed and filled with a vapor phase insulating gas of low thermal conductivity. The absorption plate has channels which form a generally sinusoidal path on its underside. These channels are defined on the lower side and lateral sides by a plastic membrane hermetically sealed to the absorption plate. A heat transfer fluid is introduced through a conduit on one side of the collector plate and allowed to leave through a conduit on the opposite side after passing through the sinusoidal path of the channels. Each conduit is hermetically sealed to its respective entrance and exit end of the channels.

Solar radiation enters through the transparent film comprising the insulating envelope and the vapor phase gas that it contains, striking the solar radiation absorption plate and creating heat which is absorbed by a heat transfer fluid on the underside of the absorption plate which is fed by conduits by means of a circulating pump. The very high efficiency of this collector is derived from the vapor phase insulating gas of an extremely low thermal conductivity which is sealed in a unique, transparent plastic envelope and placed strategically over a dead air space above the solar radiation absorption plate.

DETAILED DESCRIPTION OF THE PREFERRED EMBODIMENT

Figure 1:
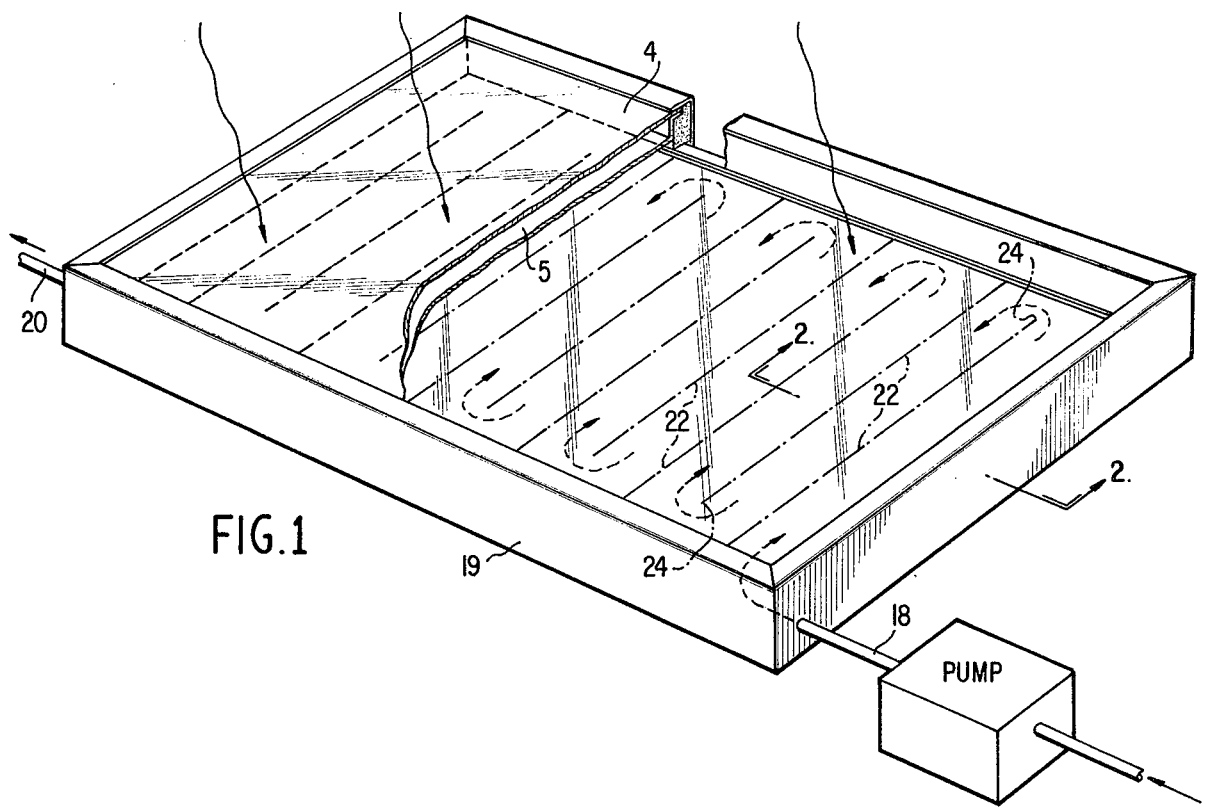
FIG. 1 is an isometric view of a flat plate solar heating panel with parts broken away illustrating a preferred embodiment of the present invention.
Figure 2:
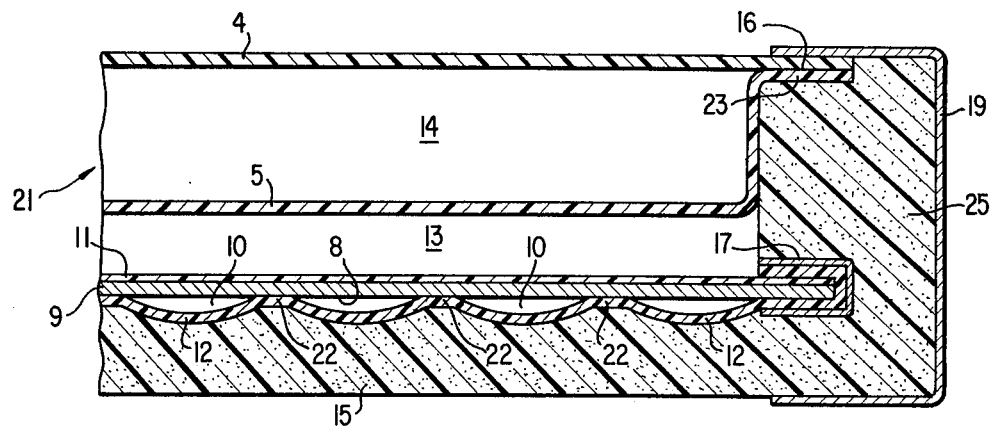
FIG. 2 is a fragmentary elevational view taken in vertical cross section along line 2—2 of FIG. 1 showing the details of the panel construction.

FIG. 1 shows an isometric view of a rectangular solar collector of the flat plate type, showing an inlet conduit 18 and an outlet conduit 20. The entire apparatus is supported on all four sides and on the top and bottom edges by sheath 19. FIG. 2 shows a cross sectional view of the panel in which solar energy enters the apparatus through sheets 4 and 5 and spaces 14 and 13 where the solar energy is absorbed by an absorption plate 9. As solar radiation is transformed into heat, heat transfer fluid traveling through chambers 10 is heated and returned to a storage facility or utilized immediately.

Figure 3:
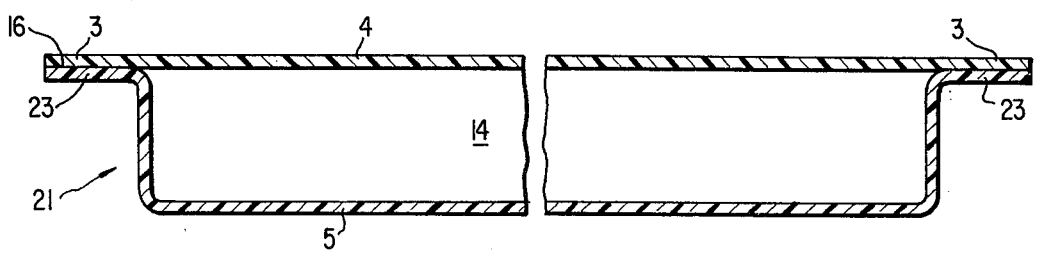
FIG. 3 is an elevational view taken in vertical cross section of a thermal insulating envelope illustrated in FIG. 1.

FIGS. 2 and 3 depict the preferred embodiment in more detail. Envelope 21 is formed by molding a flexible transparent film 5 into the desired shape and stretching taut flexible transparent film 4 on top of it forming a space or cavity 14. Films 4 and 5 are hermetically sealed at their peripheral edges 16 by joining the perimeter of film 4 to lip 23 of film 5. Preferably this is accomplished by a heat or dielectric sealing operation, although cementing or any other suitable hermetically sealing method will suffice. An insulating envelope indicated generally at 21 is formed between films 4 and 5 above the absorption plate 9 and adjacent sidewalls 25 of the panel. The envelope is kept taut either by mechanical restraints or cementing. Sidewalls 25 are preferably made from a rigid insulating material, such as styrofoam, according to conventional practices.

Envelope 21 thus has an inner space 14 in which is contained a vapor phase insulating gas of low thermal conductivity relative to air. The gas is inserted into envelope 21 by conventional means such as a needle valve and hermetically sealed thereafter. The gas within envelope 21 is allowed free thermal expansion and contraction caused by variations in the incident solar energy, because of the flexible nature of the envelope. Thus, the need for a pressure equalization membrane or valve is eliminated. Hermetic seal 16 is permanent and flexible and has a life expectancy equivalent to that of the plastic of films 4 and 5. The hermetic seal eliminates the possibility of leaks or contamination from the surrounding air which would dramatically reduce the efficiency of the collector. The use of this particular hermetic seal is an improvement over the prior art of sealing with gaskets or by cementing, in conjection with rigid or film glazings. The use of these gaskets resulted in the contamination or eventual loss of the vapor phase insulating gas. The gas within envelope 21 should be relatively clear, that is, one which allows a high percentage of solar energy transmittance, it must be stable and have excellent aging qualities especially in the continued presence of ultraviolet light. The gas must also be compatible with the plastic film which comprises the envelope, i.e., it must not cause cloudiness, crazing, cracking, brittleness, etc. The gas used in the preferred embodiment is a halocarbon or fluorocarbon noted for its excellent aging characteristics, low permeability and having a thermal conductivity of approximately 0.005 BTU/(hr) (ft) (°F.) about 33% that of air (0.15 BTU/(hr) (ft) (°F.) at 77° F. at 1 atm) making it a better insulating material than air by about 300%. The presence of flourine, bromine or other atoms from this family in the molecule give long lasting durability and stability to an organic molecule that has basically poor aging characteristics. Certain grades of polytetraflouroethylene are most suitable for the plastic film because of high transmitivity, excellent aging characteristics, compatibility with the vapor phase insulating gas, and low price. Film 4 of envelope 21 should be of a heavy enough grade (0.005 in. to 0.01 in. is sufficient) to withstand exposure to the environment. Although film 5 of envelope 21 may be of the same thickness as film 4, in an effort to cut cost, if may be of a thinner grade such as 0.001 inches. Polyester type films generally are not suitable for usage in solar applications because of ultraviolet degradation but may be used if the film has ultraviolet light absorbers or inhibitors or utilizes any method which inhibits or is resistant to the breakdown of the film by ultraviolet light. "LLumar" by Martin Processing is an example of this type of film.

Beneath absorption plate 9 are chambers 10 with their lower and lateral boundaries defined by plastic film 12 which may be of the same material as the insulating envelope. Plastic film 12 is hermetically sealed to the perimeter of the absorption plate 9, preferably folded over and sealed to the top and bottom. Alternatively, the absorption plate 9 may be folded over the marginal edges of envelope 21 and hermetically sealed thereto. Clamp 17, a mechanical restraint, extends throughout the entire perimeter, pinching both layers of the absorption plate 9 and the film 12 together and forming a stiff edge that can be mounted in a groove in side walls 25. Chambers 10 are formed by sealing flexible membrane 12 to the underside of absorption plate 9 in. long thin, spaced, parallel joints or seals stretching substantially end to end. Alternate ends of the joints or seals are spaced from the lateral edges to define openings which allow the heat transfer fluid passage from one chamber to the next until it travels beneath the entire lower surface 8 of the absorption plate 9. In this manner, a sinusoidal path is formed by the channels of film 12 which is selectively sealed to the underside of absorption plate 9. The heat transfer fluid is pumped against gravity, entering inlet conduit 18 and exiting through outlet conduit 20 which are substantially at the same elevation. By keeping the heat transfer fluid in chamber 10 directly in contact with the majority of surface 8 or absorption plate 9, heat will flow more rapidly from the absorption plate 9 to the heat transfer fluid, than would flow if small passageways separated from each other or tubing bonded to the absorption plate were used. The concept of faster, more uniform heat transference increases the overall efficiency of the collector by limiting the time of exposure to dead air space 13 and also limiting the rate of black body radiation by the absorption plate. The overall efficiency of the collector is also increased because absorption plate 9 is kept at a relatively uniform temperature, as opposed to having those areas farthest away from the heat transfer fluid, as in the case of tubing or narrow channels spaced a considerable distance apart, from building up higher temperatures resulting in a greater percentage of heat loss caused by conduction, convection and radiation. Absorption plate 9 is made of copper or some other material having a high rate of thermal conductivity to facilitate the rate of heat transfer.

Beneath membrane 12 is rigid insulating material 15, such as styrofoam, which insulates the collector on the bottom and gives rigidity to the entire system. Base 15 of the collector body is of the same material as walls 25 insulating the perimeter of the collector, giving the collector rigidity and providing a method of mounting the various components to the collector. Surrounding walls 25 is sheathing 19 which serves to hold the collector together and to define the outer lateral boundaries. Additional sheathing may be put on the bottom of base 15 to give additional strength.

Figure 5:
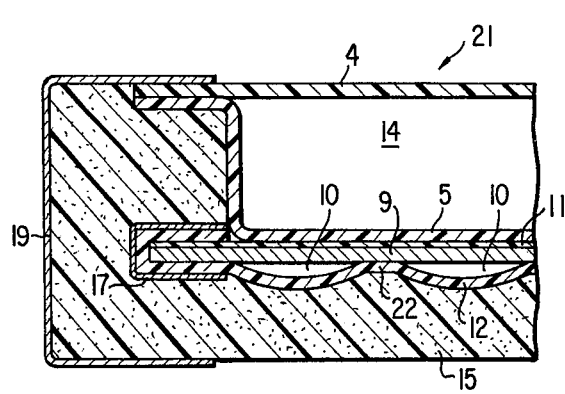
FIG. 5 is an elevational view taken in vertical cross section similar to FIG. 2 but illustrating a further embodiment of the present invention.
Figure 6:
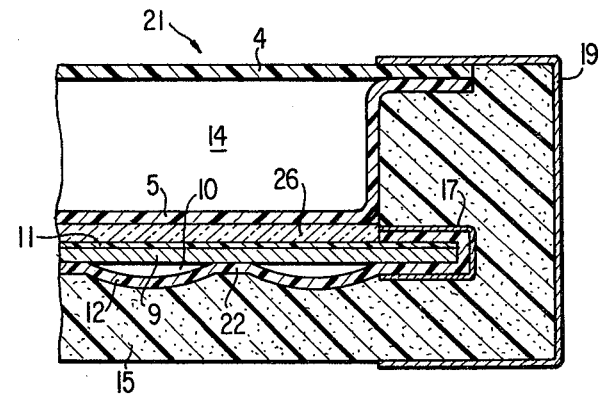
FIG. 6 is an elevational view taken in vertical cross section similar to FIG. 2 but illustrating yet another embodiment of the present invention.
Figure 7:
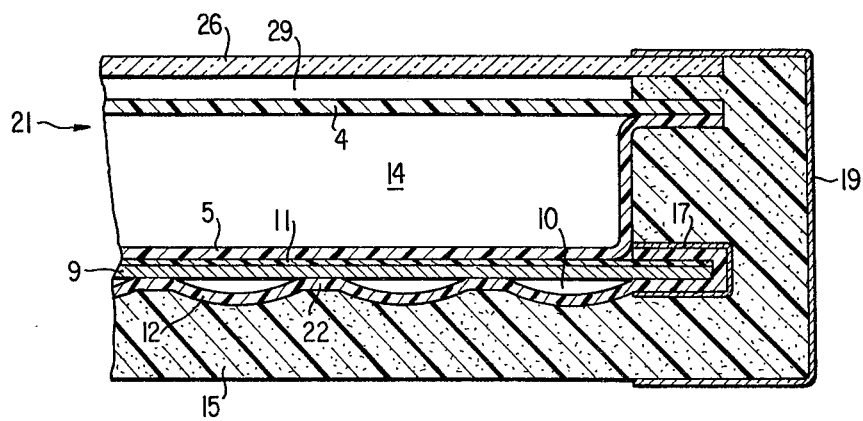
FIG. 7 is an elevational view taken in vertical cross section similar to FIG. 2 but illustrating an additional embodiment of the present invention.

FIGS. 5-7 illustrate various modifications which are capable of being employed with the basic structure illustrated in FIGS. 1 and 2. For example, the dead air space 13 of the collector panel 1 may be substantially eliminated and this is illustrated in FIG. 5. Thus, the envelope 21 may expand upwardly instead of downwardly in this embodiment. In each of FIGS. 5-7 only a single envelope 21 is illustrated, but it is to be understood that multiple envelopes may be used with or without dead air spaces.

FIG. 6 illustrates the use of a glass plate 26 atop absorption plate 9 while FIG. 7 shows the use of a similar glass plate 26 but in this form of the invention it is shown above the envelope 21. In FIG. 7 the glass plate is positioned sufficiently far above envelope 21 to leave a dead air space 29 above envelope 21. Other arrangements of the basic elements illustrated in FIGS. 1 and 2 may be employed.

It should be noted that this is the preferred embodiment of the invention and the scope of this invention is not limited to any one particular kind of film nor is the envelope limited to any particular size, shape, thickness or position relative to the absorption plate 9. The preferred embodiment uses a selective surface 11 of the upper surface of the absorption plate to inhibit infra-red radiation. A selective surface is defined as a high absorber of solar energy and a low emitter in the infra-red wavelengths and is formed in a manner familiar to those skilled in the art. However, this invention is not limited to the use of a selective surface to inhibit radiation from the absorption plate surface. Any suitable method of inhibiting radiation from the system, familiar to those skilled in the art, is acceptable. The use of certain types of glazings, such as glass, which are opaque to infra-red radiation may be used. They are placed in a position so as to keep radiation within the system, such as between absorption plate 9 and the insulating envelope 21, or even as an external coverplate on top of the insulating envelope 21. In some cases, where extremely high efficiency is not needed, it may not be desirable to insulate against radiation loss through the use of a selective surface or any other suitable means and the elimination of such inhibitors reduces the overall cost of the collector.

Between film 5 of envelope 21 and absorption plate 9 is a dead air space 13 which contributes to the overall insulating qualities of the collector. The width of space 13, although not limited to, should be one half inch when envelope 21 is in its average, operating expanded position. It has been found that a dead air space of one half inch above the absorption plate is the most desirable distance for keeping convective heat losses at a minimum. An absorption plate 9 is heated, convection currents will form; however, by keeping the vapor phase insulating gas contained in envelope 21, out of direct contact with the absorption plate 9, convective heat losses will be kept at a minimum. The gas contained in space 13 is preferably hermetically sealed and therefore subject to thermal expansion and contraction due to variations in the incident solar energy. However, no pressure equalization valve or membrane is needed because the flexible envelope 21 above it has sufficient flexibility to compensate for any variations in pressure.

Figure 4:
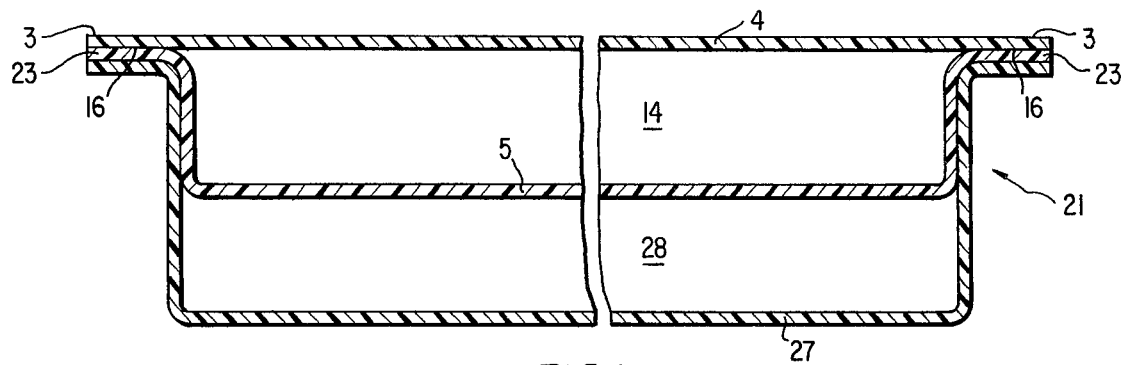
FIG. 4 is an elevational view taken in vertical cross section similar to FIG. 2 but illustrating a modified form of thermal insulating envelope.

It is considered within the scope of this invention to use more than one insulating envelope, either independently or in conjunction with each other. FIG. 4 is an example of two envelopes used in conjunction with each other. Chamber 28 is formed by hermetically sealing flexible transparent film 5 around their common perimeters and thus chambers 14 and 28 share a common wall 5. Chamber 28 may also be filled with a vapor phase insulating gas of low thermal conductivity, or may contain a dead air space, depending on the desired efficiency. These multiple chambered envelopes should be placed in a strategic position over the absorption plate 9 as in envelope 21 shown in FIG. 2. A strategic position is defined as that position relative to the absorption plate 9 that is most advantageous to the inhibition of conductive and convective heat losses. Chambers 14 or 28 may also hold a heavy or high density gas that has the ability to specifically inhibit convective heat losses.

While presently preferred embodiments of the invention have been illustrated and described, it will be recognized that the invention may be otherwise variously embodied and practiced within the scope of the claims which follow.

What is claimed is:

1. A solar heating panel comprising
   (a) a base constructed from a thermal insulating material,
   (b) a solar radiation absorption plate mounted above said base,
   (c) a hermetically sealed envelope formed from transparent polytetrafluoroethylene plastic film providing heat insulation for said solar radiation absorption plate and mounted thereabove,
      (1) said envelope being filled with a stable, vapor phase halocarbon insulating gas which is chemically compatible with the plastic material of said envelope,
      (2) said vapor phase insulating gas having a low thermal conductivity relative to air,
   (d) said absorption plate having fluid conduits disposed immediately beneath said absorption plate,
   (e) and means to deliver a heat transfer fluid through said fluid conduits.

2. A solar heating panel according to claim 1 wherein said hermetically sealed envelope is mounted sufficiently far above said solar radiation absorption plate to provide a dead air space between said envelope and said plate.

3. A solar heating panel according to claim 2 wherein said dead air space provides a cavity for said envelope but is completely separate from said envelope and permits expansion thereof above said absorption plate.

4. A solar heating panel according to claim 2 wherein said dead air space forms a separate compartment in said envelope spaced from said vapor phase insulating gas.

5. A solar heating panel according to claim 4 wherein said hermetically sealed envelope includes at least three sheets of plastic film with said vapor phase insulating gas being contained within two of said sheets of plastic and said dead air space being hermetically sealed within an envelope formed by sharing a common wall with the envelope containing said vapor phase insulating gas.

6. A solar heating panel according to claim 1 wherein said solar radiation absorption plate is made of a durable material of high thermal conductivity and has the edges of a plastic film membrane disposed on the underside thereof hermetically sealed to the marginal edges of the absorption plate and wherein channels are formed by sealing the membrane to the absorption plate in long thin parallel lines terminating short of the edges of said absorption plate to provide openings at alternate ends forming a serpentine path which allows the passage of a heat transfer fluid so that the fluid comes in contact with a major portion of the lower side of said absorption plate and is allowed to enter and leave through sealed conduits on opposite sides of the collector.

7. A solar heating panel according to claim 1 wherein said gas used in said vapor phase insulating envelope is a fluorocarbon having a low thermal conductivity relative to air.

8. A solar heating panel according to wherein said plastic film used in said vapor phase insulating envelope is a polyester type film which resists degradation of the plastic film by ultraviolet light.

9. A sealed envelope for use in a solar collector panel, said envelope having
   (a) top and bottom panels made from a plastic material transparent to visible radiation with said panels being hermetically sealed as to form an insulating envelope means,
   (b) and a stable, vapor phase halocarbon insulating gas which is chemically compatible with the plastic material of said envelope sealed within said envelope,
      (1) said vapor phase insulating gas having a low thermal conductivity relative to air,
   (c) said envelope means adapted to be placed so as to inhibit conduction and convection with respect to a heat absorbing surface in a solar collector panel.

* * * * *